Aug. 15, 1961  R. D. PARRY  2,996,269
HELICOPTER WITH COUNTER-ROTATING PROPELLER
Filed April 12, 1956  5 Sheets-Sheet 5
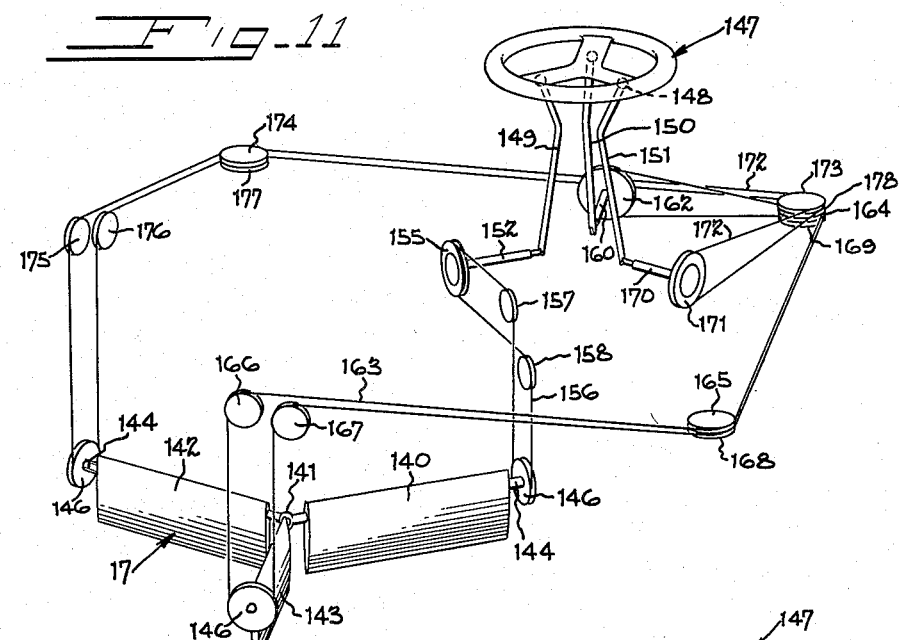
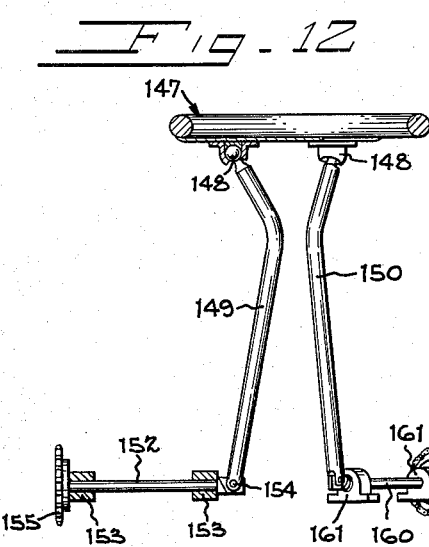
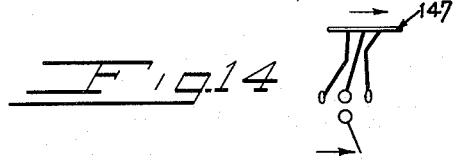
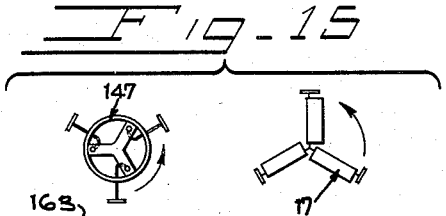
INVENTOR.
Robert D. Parry.
BY Wood, Herron & Evans.
ATTORNEYS.

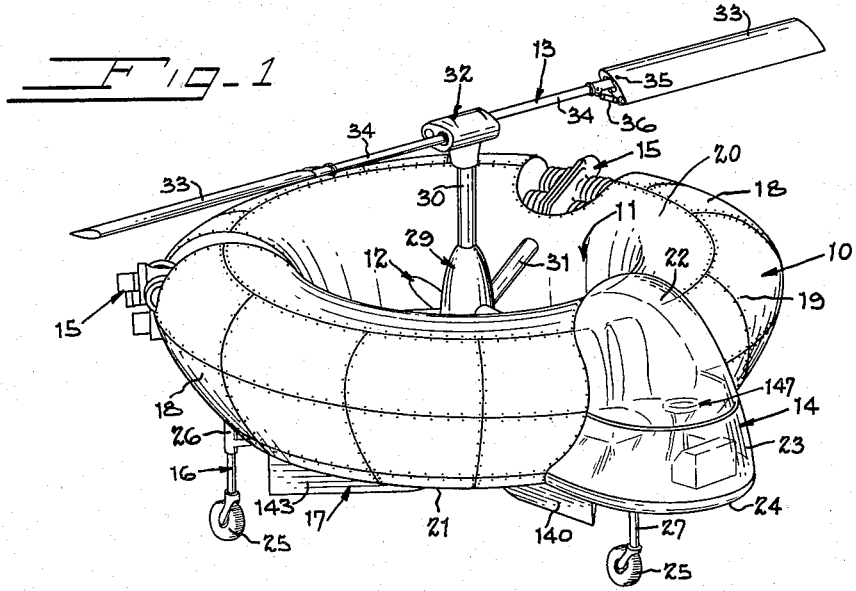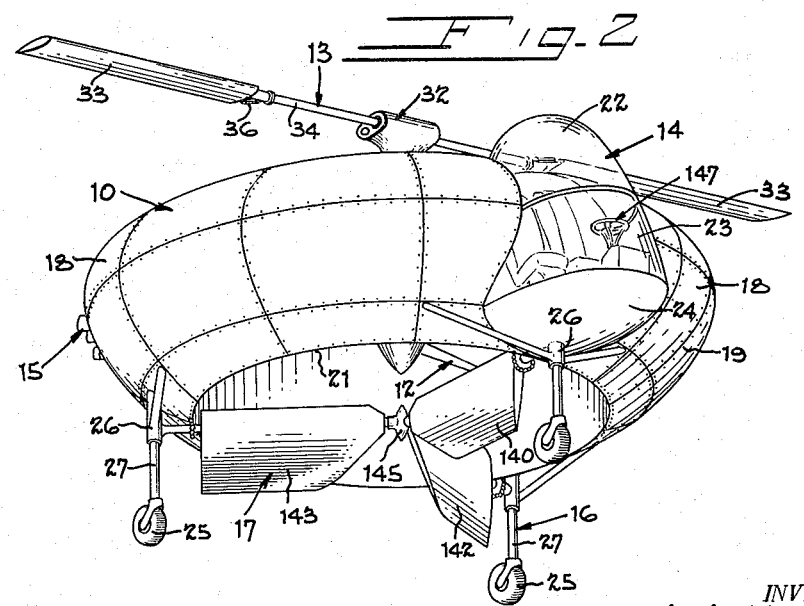

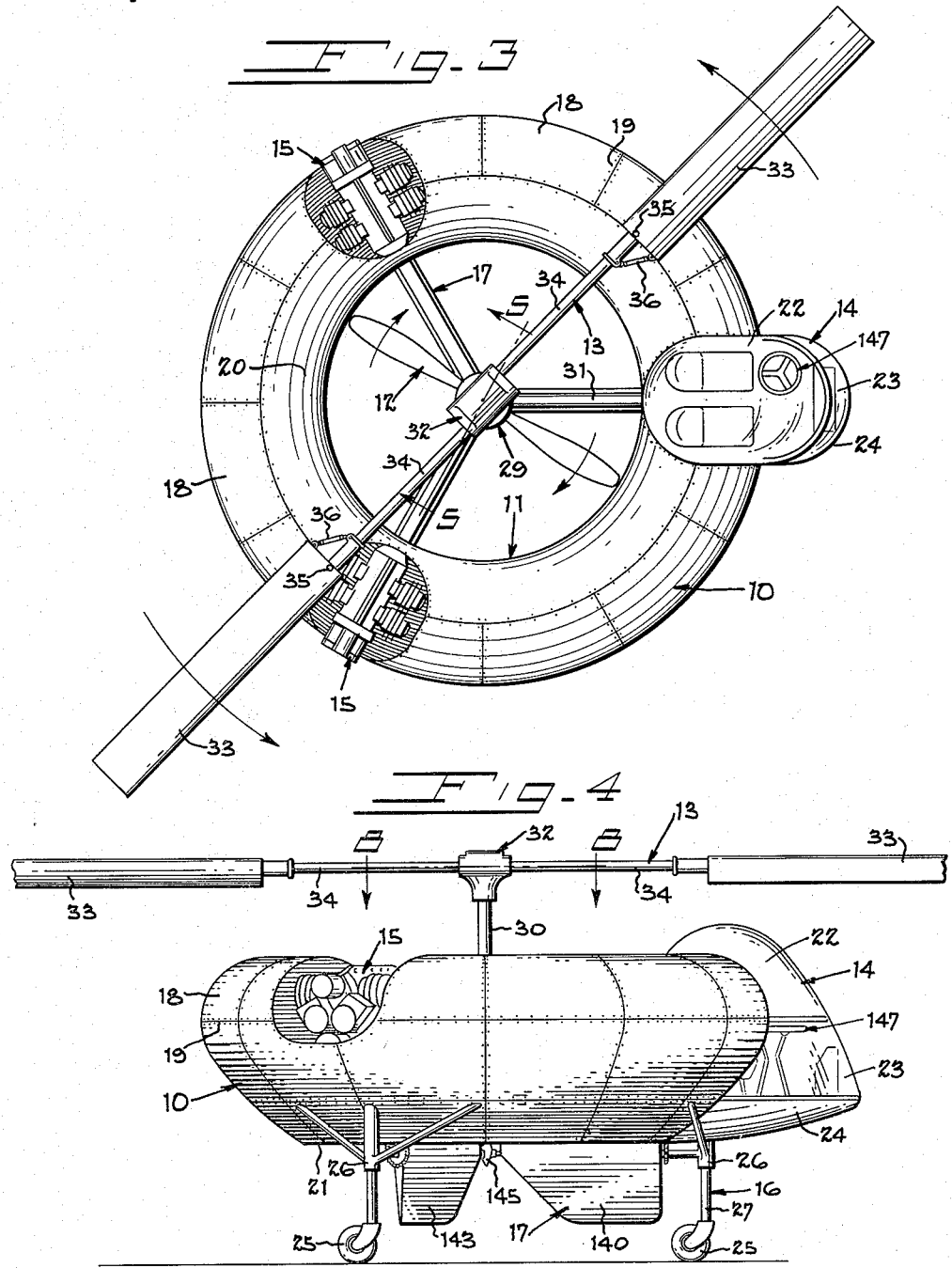

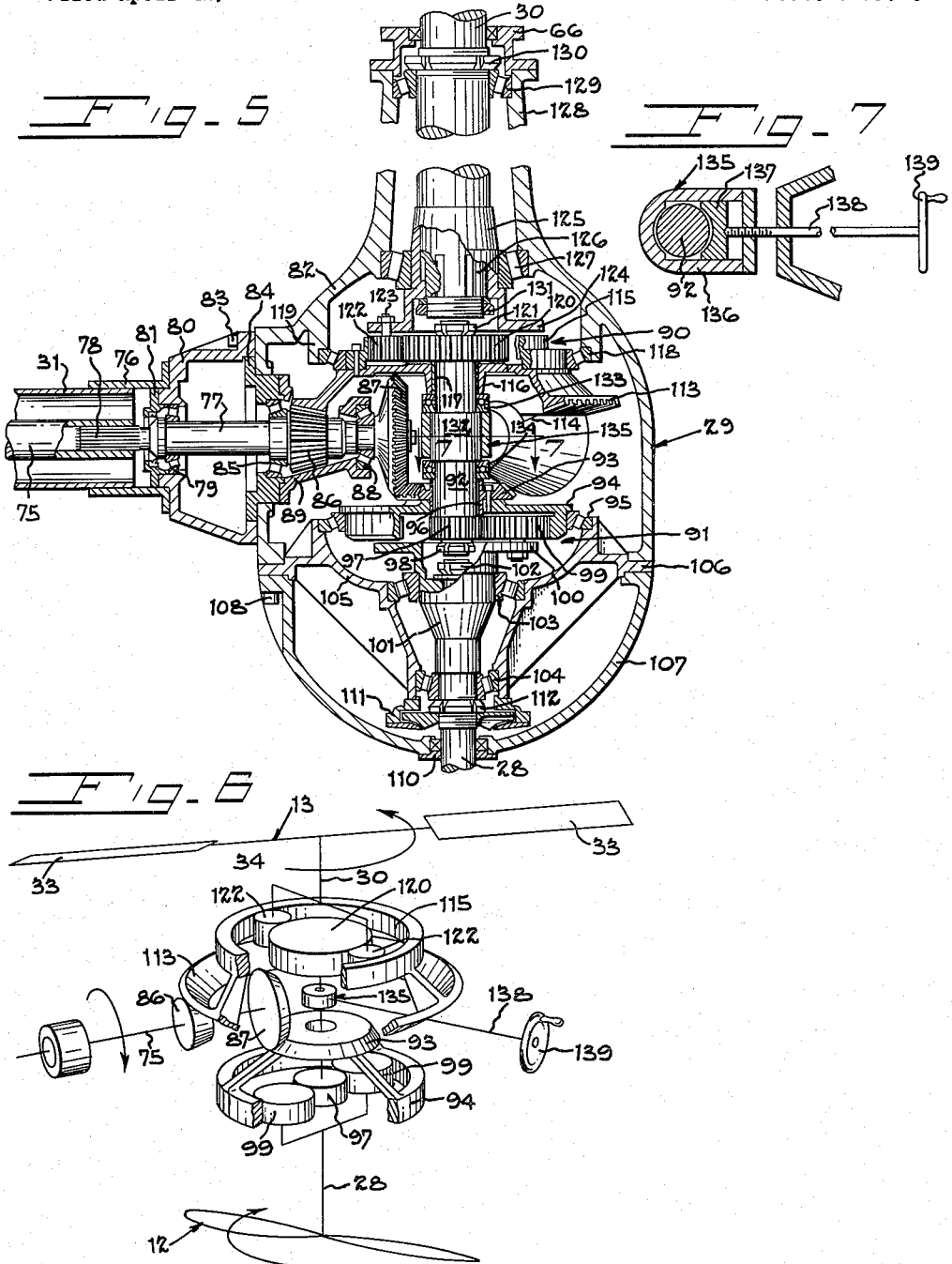

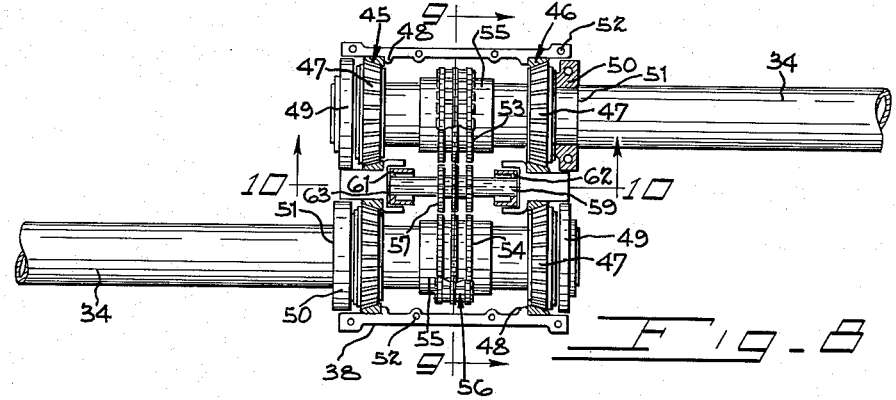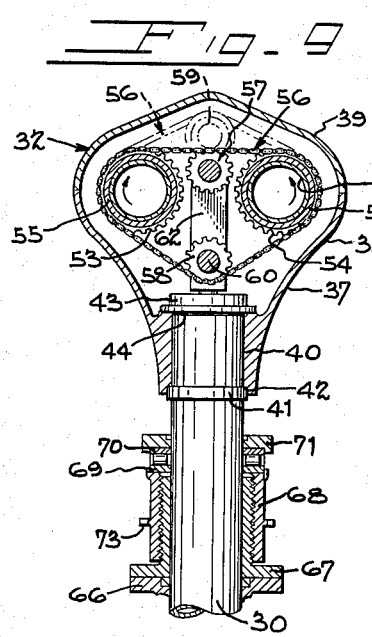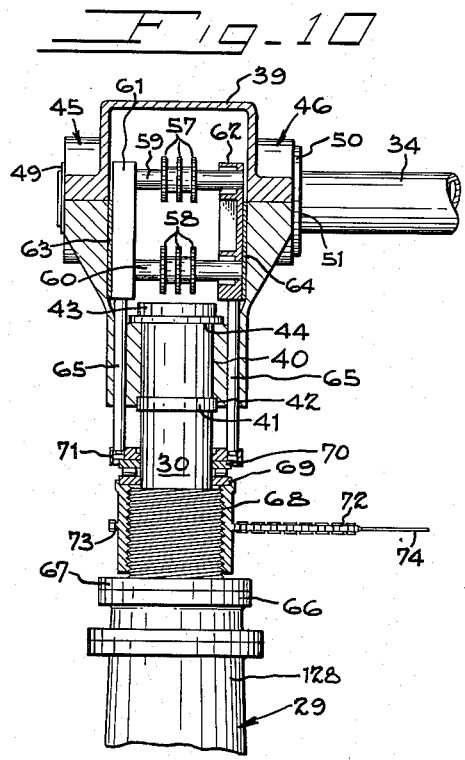

United States Patent Office 2,996,269
Patented Aug. 15, 1961

2,996,269
HELICOPTER WITH COUNTER-ROTATING PROPELLER
Robert D. Parry, 1336 Custer Ave., Cincinnati, Ohio, assignor of twenty percent to Charles B. Bolton, ten percent to Kenyon C. Bolton, and twenty percent to Justin G. Sholes, all of Cleveland, Ohio
Filed Apr. 12, 1956, Ser. No. 577,795
15 Claims. (Cl. 244—17.19)

This invention relates to helicopters and it is directed in particular to a helicopter which employs a comparatively small, high speed propeller and a comparatively large low speed, vaned rotor to lift it and to sustain it in flight.

The fuselage of the helicopter is generally circular and it has a substantially large cylindrical throat which passes vertically through it. The propeller and the rotor are mounted for rotation about the central axis of the throat with the propeller being located within the throat and with the rotor being disposed above the fuselage. The pilot's compartment preferably is at the outer edge of the fuselage and he sits with his back to the fuselage so that his view is unobstructed. The engine or engines to drive the rotor and the propeller are located at the side of the fuselage opposite to the pilot's compartment so as to distribute as evenly as possible the weight with respect to the central axis of the aircraft.

One of the problems inherent in a helicopter or other aircraft employing a large rotor is the torque developed which tends to cause the aircraft to rotate or yaw in a direction counter to the direction in which the rotor is driven. In the helicopter of this invention this problem is overcome by driving the rotor and the propeller through a novel transmission which rotates the rotor in one direction and the propeller in the opposite direction while at all times maintaining the same torque force on the rotor and on the propeller regardless of the difference in their sizes and the difference in their relative speeds.

Both the rotor and the propeller create lift. However, whereas the rotor may rotate at 250 revolutions per minute, the propeller may rotate at 1700 revolutions per minute. The rotor creates lift in the way the rotor of a conventional helicopter creates lift. Being located above the fuselage, it is provided with vanes or airfoil sections which extend out beyond the sides of the circular fuselage. The propeller which may be a fixed pitch type, being located in the throat, propels a high speed stream or column of air down through the throat which is exhausted at the underside of the fuselage as a jet stream to create an upward thrust or lift. Directing vanes located within this high speed stream or column of air are provided which may be selectively angulated with respect to the direction of flow of the air for controlling the direction of flight of the helicopter and for changing its attitude in flight generally. The propeller thus does useful work in the present helicopter, which is in contrast to propellers employed solely to counteract the torque of the rotor.

It will be seen, therefore, that one of the objectives of the invention is to provide a helicopter employing a counter rotating propeller to overcome torque developed by the rotor, which propeller creates useful thrust as lift and which also, in combination with directing vanes, controls the attitude and direction of the aircraft.

Other objectives of the invention will be readily apparent to those skilled in the art from the following detailed description of the drawings in which:

FIGURE 1 is a perspective view of a helicopter incorporating the principles of the present invention, the observer being above and at one side of the front of the helicopter, FIGURE 2 is a perspective view showing the underside of the helicopter.

FIGURE 3 is a top plan view thereof.

FIGURE 4 is a side elevational view thereof.

FIGURE 5 is a fragmentary cross sectional view taken on the line 5—5 of FIGURE 3 illustrating the details of construction of the transmission through which the rotor and the propeller are driven.

FIGURE 6 is a diagrammatic perspective view, shown partly in section, to illustrate the various components of the transmission.

FIGURE 7 is a fragmentary cross sectional view taken on the line 7—7 of FIGURE 5.

FIGURE 8 is a fragmentary cross sectional view taken on the line 8—8 of FIGURE 4 illustrating the construction of the rotor hub.

FIGURE 9 is a cross sectional view taken on the line 9—9 of FIGURE 8.

FIGURE 10 is a cross sectional view taken on the line 10—10 in FIGURE 8.

FIGURE 11 is a schematic layout of the control system of the helicopter.

FIGURE 12 is a side view, shown partly in section, of the control wheel employed in the control system.

FIGURES 13–15 are diagrammatic views illustrating the operation of the control system.

The fuselage of the helicopter is designated generally by the numeral 10 in the drawings. As shown, the fuselage is generally circular and it is open at the center to define a throat 11 which extends vertically through it. Mounted within the throat, for rotation about the vertical central axis of the throat, is a propeller 12. Above the fuselage and on the same axis of rotation a rotor 13 is mounted. In the instance shown, a pilot's compartment or cockpit 14 is provided at one side of the fuselage, this side of the fuselage being the front of the helicopter. Two air cooled aircraft engines 15—15 are employed to drive the propeller and rotor. These engines are mounted in the fuselage at the side opposite the cockpit and in spaced relationship, such that the cockpit and the two engines are spaced from one another by 120 degrees. This is done so as to distribute the weight of the engine and the cockpit evenly around the vertical central axis of the aircraft. Obviously, if one engine is used it should be placed in the fuselage at a point diametrically opposite the cockpit. The engines preferably are exposed for cooling purposes. Landing gear designated generally 16 is provided at the underside of the fuselage. Three directing vanes, designated generally 17, used to control the direction and attitude of the aircraft in flight, are provided immediately adjacent the exit of the throat. These vanes also are disposed at 120 degrees with respect to one another, and they are oriented so that one is aligned fore and aft, using the pilot's compartment as the front of the helicopter.

Fuselage

The fuselage 10 may be built up using known airframe construction techniques to the shape shown. In the present instance, the outer surface comprises a plurality of lightweight metal sheets 18 which are secured to the airframe members (not shown) by rivets 19. Preferably, the "skin" or lining for the inside of throat 11 is formed to provide a rounded flaring entrance 20 into the throat at the upper side of the fuselage. The exit to the throat preferably terminates at a sharp break 21 at the underside of the fuselage. It will be seen from the first four figures of the drawings that the fuselage is generally streamlined in the vertical direction. It will also be seen that the cockpit extends out from the side of the fuselage so as to provide good visibility for the pilot. In the instance shown, the upper part of the pilot's compartment is enclosed within a plastic bubble or canopy 22, and the lower part of the enclosure consists of a transparent wall 23. The canopy and part of the wall may be hinged to provide access into the pilot's compartment. Floor portion 24 of the cockpit may be built up of a framework which is covered at the underside by metal sheets similar to the plates 18 which enclose the outside of the fuselage. The details of construction of the cockpit, the fuselage and the engine mounts are not shown here, because it is within the knowledge of those skilled in the art of fabricating airframe structures to construct these elements.

The landing gear 16 comprises caster-mounted wheels 25 which are mounted in brackets 26. Preferably, shock absorbing struts 27 are employed between the wheels and the brackets. Three such wheels are used, these being spaced 120 degrees from one another with one of the wheels being located underneath the pilot's compartment. This places the other two wheels under the two engines. Here again, the construction of the landing gear is unimportant insofar as the invention is concerned, and it is believed to be within the knowledge of those skilled in the art to provide the details of construction and the manner in which brackets 26 may be joined to the structural frame members inside of the fuselage.

*Propeller*

A conventional aircraft propeller may be employed which is of a diameter slightly less than the diameter of the throat 11. In the instance shown in FIGURE 3, the propeller rotates in a counter-clockwise direction as viewed from above so as to drive or propel a column of air down through the throat. A fixed pitch propeller may be used. However, since it is desirable, in starting the engines for example, to feather the blades, known pitch changing devices may be employed. The propeller is driven by means of a shaft 28 which extends downwardly from the lower end of a transmission housing 29. Another shaft 30 extends from the upper end of the transmission housing, and it is in driving connection with the rotor 13. The transmission housing is located approximately in the center of the throat, and it is supported therein by means of three tubular members each of which is designated 31. These tubular members are in the same horizontal plane and they are spaced from one another at 120 degrees, with two of them joining the two engines to the transmission and with the third extending from the transmission to the rear of the cockpit. Generally, the drive shafts (not shown) of the two engines extend through the two tubes in the rear half of the throat, whereas control devices, to be described at a later point, extend through the tube joining the transmission to the cockpit. The outer ends of the tubes may be rigidly secured to the structural frame members of the fuselage following known techniques.

*Rotor*

The rotor consists of a hub 32, a pair of diametrically opposed vanes 33—33 and two tubular arms 34—34 which secure the vanes to the hub. The vanes 33—33 are fabricated following known techniques so that each one constitutes an airfoil section. It is preferred that the airfoil section be a symmetrical one; that is, one in which the chord line is located midway between the upper and lower surfaces of the section. However, it is anticipated that other airfoil sections may be used where conditions warrant. It will be seen in FIGURE 3 that the two vanes are to the outside of the throat area of the fuselage, and that they overhang the sides of the fuselage for a considerable extent of their overall lengths. A portion only at the inner end of each vane is above the fuselage to drive cooling air down over the two engines which are exposed beneath them. In each instance, the outer end of the respective tubular arms 34—34 is configurated to provide a clevis into which the inner end of the vane may be socketed. A clevis pin 35 secures the vane in place.

It will be noted from FIGURE 3 of the drawings that the clevis pin joins the rotor arm to the vane at a point nearer to the leading edge of the vane than to the trailing edge thereof. To provide adjustment in the "lead" or "lag" of the two vanes relative to the tubular arms 34—34, an adjustable link 36 may be used to connect the inner end of the trailing edge of each vane to the tubular arm at a point spaced inwardly from the clevis pin 35.

The two tubular arms 34—34 of the rotor are offset to the two sides of the vertical axis of rotation of the rotor such that the longitudinal axes of the rotor arms are tangent to a circle centered on the vertical axis. See FIGURE 8.

The hub comprises a split casting 37 consisting of a lower part 38 and a cover 39. The lower end of part 38 is generally oval and it has a cylindrical bore 40 extending vertically through it which is rigidly engaged upon the upper end of the rotor drive shaft 30. The shaft has a fixed collar 41 on it which is seated in a counter bore 42 at the lower end of bore 40. A cap 43 fixed to the upper end of shaft 30 has an annular flange 44 on it which engages the casting 37 surrounding the upper end of bore 40. If desired, cap 43 may be threaded on the end of shaft 30, and in addition the casting 37 may be pinned directly to the shaft 30 by means of a cross pin or fastened to it by other known expedients in order to prevent relative rotation between the shaft and casting. The casting 37 flares upwardly and outwardly from the connection to shaft 30 to enclose the inner ends of the two rotor arms. The casting is split on a horizontal plane which passes through the central axes of the two arms, see FIGURE 9.

Each side of the hub provides spaced journals 45 and 46 for the inner ends of the two tubular arms. It is important that the inner ends of the two rotor arms be journalled so that they can rotate freely about their longitudinal axes and for this purpose a pair of thrust bearings 47—47 are used at the two journals. In each case the thrust bearing is mounted on the arm, and it is held in place against an internal shoulder 48. At the extreme inner end of the arm a locked nut 49 is provided to hold the thrust bearing in place. At the opposite side, a collar 50 which rests against a shoulder 51 on the arm holds the thrust bearing in place. Additional, other appropriate locking devices may be used if desired to insure that the arm does not shift within the journals. As shown in FIGURE 8, the upper part or cover 39 of casting 37 may be secured to the lower part by means of bolts which engage into threaded bores such as those shown at 52.

The two rotor arms are linked together by means of sets of sprocket wheels and pitch chains. The set of sprockets on the arm which is at the left in FIGURE 9 is designated 53, and the set which is at the right in this figure is designated 54. These sets of sprockets are secured to a collar 55 in each case which is rigidly pinned or otherwise affixed to the arm between the respective thrust bearings of journals 45 and 46. In the present case three sprockets are provided for each arm. Three pitch chains, indicated generally at 56, extend around the sets 53 and 54 of sprockets, however, they are also engaged with a pair of upper and lower idler sprockets designated 57 and 58 respectively. As may be seen in FIGURES 9 and 10, these idler sprockets are also provided in sets of three, and they are spaced apart vertically by an amount substantially greater than the diameters of the other sets of sprockets 53 and 54.

The two sets of idler sprockets are mounted upon upper and lower stub shafts 59 and 60 respectively. The opposite ends of the two shafts are freely journalled in slide blocks 61 and 62. These blocks are vertically slidably mounted in grooves or ways 63 and 64 which are formed in the opposite sides of the lower part 38 of the hub casting between the two arms 34—34 of the rotor. The two slide blocks are actuated through two push rods 65—65 which extend down through bores in the casting at the opposite sides of the drive shaft 30. The upper end of the transmission housing 29 has an integral annular flange 66 upon it. A flanged, threaded bushing 67 is affixed to the flange 66 so that it cannot rotate with shaft 30 even though the shaft extends through it. An internally threaded sleeve 68 is engaged on the threaded bushing 67 so that upon rotation of the sleeve it is either raised or lowered with respect to the bushing depending upon which way it is rotated. The upper end of the sleeve 68 seats the lower race 69 of a roller bearing, whereas the upper race 70 of this bearing is secured to a thrust plate 71. The lower ends of the two push rods 65—65 are secured to the thrust plate at the opposite sides of shaft 30. The threaded sleeve 68 may be moved up and down from the cockpit of the aircraft by means of a pitch chain 72 which is engaged with the lugs of a sprocket 73 affixed to the outer periphery of the threaded sleeve. Means such as a cable 74 may extend from the pitch chain into an appropriate actuating device located inside of the cockpit.

It will be seen from FIGURE 10 that rotation of the threaded sleeve 68 will cause the two push rods to be elevated which slides the blocks 61 and 62 upwardly in their ways. The two idler sprockets 57 and 58 thus move up between the two sprockets 53 and 54 which are on the inner ends of the rotor arms and as a result, the two arms are rotated toward one another as may be seen from the arrows in FIGURE 9. This movement is effective to increase equally and simultaneously the angle of attack of the two rotor vanes. Preferably, the two vanes are set initially so that they have either a zero angle of attack or a slight negative angle of attack when the two idler sprockets 57 and 58 are in their lowest positions, see FIGURE 9. The maximum angle of attack for the two vanes is when the two idler sprockets are in their elevated positions shown in dot-dash lines in FIGURE 9. This type of pitch change is the one referred to previously as "collective" pitch change.

The other type of pitch change in which the vanes individually adjust themselves in order to compensate for differences in relative air speeds at the two sides of the fuselage of the aircraft, is a result of the linkage between the two sprockets 53 and 54 which are fixed to the inner ends of the rotor arms. Under a condition in which the helicopter is flying in the direction toward the top of the sheet upon which FIGURE 8 appears and the rotor is revolving counter clockwise as seen in this figure, the vane on the right rotor arm would have to have a considerably smaller angle of attack than the vane on the rotor arm at the left. Due to the off center attachment between the arm and the vane at clevis pin 35, the vane at the right side in moving into the relatively higher air speed zone at the right tends to feather or streamline itself. This causes the front set of sprockets to turn in a clockwise direction as viewed in FIGURE 9, which in turn causes the opposite arm to also turn in a clockwise direction (as viewed in this figure) which has the net effect of increasing the pitch of the vane at the left. The left vane, however, since it is moving through the air also has a tendency to feather. The two feathering forces balance one another as a result of the tie between the two rotor arms such that balancing angles of attack are automatically set into the two vanes.

The automatic change in pitch during flight is a continuous one with the maximum difference in pitch between the two blades being when they are at the sides of the aircraft. When the rotor reaches a point fore and aft of the direction of flight of the helicopter, the angles of attack or pitch of the two vanes are substantially identical. It will be appreciated that collective pitch changes made by the pilot through the raising and lowering of the two idler sprockets 57 and 58 has no effect upon, nor is it affected by, movement of the pitch chains during the continuous, automatic changes in the respective angles of attack occurring during flight,

*Transmission*

When two engines are employed to drive the propeller and rotor, as in the case shown in the drawings, the two drive shafts only one of which is shown at 75, extends from the engines through the respective tubes 31 which are in the rear half of the throat and to the transmission housing 29. Preferably, the drive shafts 75 are hollow. The outer end of each tube has affixed to it a flanged sleeve 76 which may be secured directly to the transmission housing by means such as bolts (not shown). Each drive shaft is keyed to a short shaft 77 by means such as the splines shown at 78. Inasmuch as the connection to the transmission for each of the drive shafts is the same only one is shown and described here. The shaft 77 is journalled at its outer end in a thrust bearing 79 which is seated within the outer end of a journal box 80. A retainer ring 81, having an appropriate oil seal, is employed to secure thrust bearing 79 in place at the outer side of the journal box. The journal box is secured to the main casting, designated 82, of the transmission housing by means such as bolts, only one of which is shown at 83. The journal box is hollow at its interior and it has at its inner end a circular seat for a journal ring 84. The journal ring 84 seats a second thrust bearing 85, for the shaft 77, and the shaft has keyed to it a small bevel gear 86 just inwardly of the thrust bearing. The shaft 77 extends into the transmission past the small bevel gear, and at its inner end it has keyed to it a second bevel gear 87 which is substantially larger than gear 86. Just to the outside of the larger bevel gear, the shaft is journalled in a third thrust bearing 88. The latter bearing is seated within the inner end of a journal cone dseignated 89. The outer end of the cone is seated against the inner face of the journal ring 84 and it may be secured to it by bolts or by other appropriate means. The two bevel gears 86 and 87, being keyed directly to shaft 77, rotate at the speed of the engine to which the hollow shaft 75 is connected.

The inside of the transmission mounts two planetary gear units, an upper one designated generally by the numeral 90 and a lower one designated by the numeral 91. The upper planetary gear unit is in driving connection with the shaft 30 for the rotor, whereas the lower planetary gear unit is in driving connection with the shaft 28 for the propeller. These two shafts are in axial alignment with one another on the vertical central axis of the throat within fuselage 10. In addition to their connections respectively to the rotor and propeller, the two planetary gear units are also connected to one another by means of a shaft 92 which is at the center of the transmission. In general, the gears within the transmission are arranged such that when the drive shaft from the engine is rotating at approximately 2600 revolutions per minute the shaft 30 to the rotor is rotating at 300 revolutions per minute, whereas the shaft 28 to the propeller is rotating at 2000 revolutions per minute. These speeds are set forth merely by way of example, it being appreciated that the speeds developed at shafts 28 and 30 are directly related to the sizes, inertia, and pitch of the rotor and of the propeller. In addition, as will be explained later, the speed of shaft 30 may vary considerably with respect to shaft 28, this being a very important function of the double planetary gear units which are employed in the transmission.

Describing the lower planetary gear unit 91 first, the larger bevel gear 87 which is at the inner end of shaft 77 is in driving connection with a bevel gear 93 which has approximately the same pitch diameter. The latter bevel gear 93 is secured directly to a substantially larger pitch diameter internal gear 94 which is journalled at its outer periphery in a circular thrust bearing 95 such that it is free to rotate. A bushing 96, which is seated within the common centers of gears 93 and 94, journals the lower end of the shaft 92 which connects the lower planetary gear unit to the upper planetary gear unit so that there may be relative rotative movement between the shaft 92 and the gears 93—94. Shaft 92 also has a pinion gear 97 keyed to its lower end within the same plane as the teeth of the internal gear 94. This gear is locked on to the lower end of shaft 92 by means of a nut 98. Within this same plane, at least two moon gears of the lower planetary unit, one of which is shown at 99, are disposed in mesh with the teeth of the internal gear 94 and the teeth of the pinion 97. As suggested, there may be two or more moon gears and they are mounted upon stub shafts, so that they can rotate freely, which are carried by a flange 100 which is at the upper end of a hollow drive cone 101. The shaft 28, which is in direct driving connection with the propeller, extends up through drive cone 101 and is keyed directly to it by splines or other known means. The upper end of drive shaft 28 is threaded and a nut 102 engaged on it. The drive cone is mounted for rotation in an upper thrust bearing 103 and a lower thrust bearing 104. These two thrust bearings are appropriately mounted within annular seats which are machined in a hollow casting 105. It will be noted that the casting 105 has at its upper end an annular seat in which the thrust bearing 95 for the internal gear 94 is journalled. The walls of the casting preferably are substantially thin to reduce weight and in order to strengthen it, it is preferred that the casting have a plurality of ribs on its outer side as shown in FIGURE 5. There is a peripheral flange 106 on the casting 105 which is secured to the main casting 82 of the transmission housing. In addition, there is a bell shaped housing 107 which encloses the lower end of the planetary unit 91, this bell shaped housing being bolted directly to the main casting 82 by means of bolts 108 which pass up through the peripheral flange 106 and into threaded bores within casting 82.

The shaft 28 extends through the lower end of the bell shaped casting with an appropriate oil seal 110 being provided. Immediately above the seal, an oil pump 111 is keyed to shaft 28 for feeding lubricating oil from the bottom of the transmission, formed by the bell shaped housing 108, up to the gears of the transmission. A specific oil system is not shown here inasmuch as it is believed to be within the expected skill of those in the art to provide such facilities. The lower end of the drive cone 101, which is seated within the thrust bearing 104, extends slightly below the thrust bearing and it is threaded to accommodate a lock nut 112. Tightening this nut serves to lock the drive cone in place against the inner races of the respective thrust bearings 103 and 104.

It will be seen, therefore, that the drive to the propeller comes from the engine through the bevel gears 87 and 93. This causes the large internal gear 94 to rotate, which in turn drives the moon gear around the pinion 97 to rotate the drive cone which is keyed to shaft 28.

The upper planetary gear unit 90 has parts which complement the parts of the lower planetary gear unit, however, corresponding gears are of different sizes to reduce the speed from the engine drive shaft to the shaft 30. Bevel gear 86 which is on shaft 77, is in mesh with a bevel gear 113. This latter gear is the largest in the transmission and being driven from the comparatively small bevel gear 86, it constitutes one of the main factors in reducing the speed from the engine to the rotor shaft 30.

It will be noted that the upper part of the journal cone 89 is cut out as at 114 to permit the large bevel gear 113 to mesh with bevel gear 86. As in the case of the lower planetary gear unit, bevel gear 113 is secured directly to the underside of an internal gear 115. In this instance, however, the internal gear is seated in an annular groove which extends around the bevel gear 113. The internal gear and bevel gear are free to rotate with respect to connector shaft 92 inasmuch as a central journal sleeve 116 provided in the large bevel gear 113 which seats a bushing 117 through which the upper portion of the shaft 92 extends.

The outer periphery of internal gear 115 seats a thrust bearing 118, the outer race of which is engaged in a groove formed in an annular wall 119 which depends from the main casting 87 of the transmission housing. A pinion gear 120 is keyed directly to the upper end of shaft 92 in the plane of the teeth of internal gear 115 immediately above the bushing 117. A nut 121, threaded on the upper end of the shaft locks pinion gear 120 in place. It will be noted that the pinion 120 is considerably larger than pinion 97. The moon gears, one of which is designated 122, of the upper planetary unit are meshed with the teeth of internal gear 115 and with the pinion 121 and the moon gears are journalled upon means such as stub shafts, one of which is shown at 123, the stub shaft depending from an annular flange 124 of an upper drive cone 125. The latter cone is keyed directly to the lower end of the rotor shaft 30 by splines designated 126.

The drive cone 125 has a peripheral seat on it which receives the inner race of a thrust bearing 127. The outer race of this bearing is seated in a groove within casting 82. It will be noted that the upper part of the casting 82 is necked down and this necked down portion, indicated generally at 128 extends up to provide a seat for an upper thrust bearing 129 for the rotor shaft 30. The rotor shaft 30 and drive cone 125 are secured in place in the necked down portion of casting 82 by means of an upper nut 130 which is tightened down against the inner end of thrust bearing 129 and a nut 131 which is threaded on to the lower end of shaft 30 and tightened against an internal shoulder within the driving cone.

In summary, therefore, the engine drive to the rotor shaft 30 comes through the bevel gear 86, the large bevel gear 113, the internal gear 115 and the moon gears 122 which are carried by the drive cone 125.

The connector shaft 92 plays an exceedingly important role in the transmission. Since the drive to the lower planetary gear unit 91 is from the underside of the bevel gear 87, and since the bevel gear 113 is driven from the upper side of the bevel gear 86, the two planetary gear units are driven in opposite directions. This results in the counter rotation of the propeller with respect to the rotor. The primary function of the connector shaft 92 is to equalize the torque which is developed at the rotor and at the propeller under all operating conditions.

Attention is directed to FIGURE 6, assuming a condition of torque balance between the rotor and propeller and also assuming that the rotor is rotating in a counter-clockwise direction, as seen from above, the internal gear 115 also rotates in a counter-clockwise direction. The two moon gears 122 also rotate in the counter-clockwise direction and advance around the pinion 120 in the counter-clockwise direction. This assumes, of course, that the pinion gear 120 is not rotating, which would be the case under the condition set forth. Rotation of the moon gears 122 around pinion 120 tends to cause the pinion to rotate in a clockwise direction. Going now to the lower planetary gear unit, the internal gear 94 is rotating in clockwise direction as viewed from above, the moon gears 99 are also rotating and advancing around pinion gear 97 in the clockwise direction so that the tendency is to rotate pinion gear 97 in the counter-clockwise direction which is just the opposite to the direction in which pinion gear 120 tends to rotate. These forces balance themselves through connector shaft 92, and thus prevent the shaft from rotating.

Assuming now a condition in which the rotor is turning slowly and the pilot wishes to accelerate, the rotor, being larger than the propeller, requires more force to accelerate than the lighter, smaller propeller. Hence, the inertia of the rotor slows down the orbital motion of the moon gears 122 about the pinion gear 120, and the latter gear, being connected to the lower planetary gear unit which drives the light propeller, now begins to rotate. This rotates the pinion 97 which speeds up the orbital motion of the moon gears 99 and thereby applying a torque to the lower propeller which balances the torque on shaft 30. It will be seen from this, that there are always equal and opposite torque forces at the two shafts 28 and 30 so as to prevent an unbalanced torque being applied against the aircraft as a whole to cause it to yaw.

Referring again to FIGURE 5, provision is made to apply a braking force to the connector shaft 92. The center of the shaft has a collar 132 upon it. This collar is disposed between upper and lower ball bearings 133 and 134. The respective bearings rest against the shoulders provided by the collar and take up the endwise thrusts of the two lock nuts 98 and 121. Under normal circumstances, the shaft 92 is free to rotate within a braking device designated generally 135. FIGURE 7 shows, diagrammatically, a simplified version of a braking device which may be employed. The braking device comprises a yoke 136 which surrounds the collar in the central portion of shaft 92, a brake shoe 137, a threaded actuator shaft 138 for the brake shoe, and an actuator wheel 139 which is located in the cockpit of the aircraft. As may be seen, rotation of the wheel 139 in one direction caues the shoe 137 to be clamped against shaft 92, whereas rotation of the wheel in the opposite direction frees the brake shoe from the shaft. The brake is employed as an emergency expedient when there is a power failure. Under these conditions, the shaft 92 is locked by the pilot. The upper planetary unit then is driven by the windmilling of the rotor which drives the lower planetary gear unit and the propeller through the two bevel gears 86 and 87. This keeps the propeller rotating at a speed to maintain a flow of air over the control vanes 17 so that the pilot may alter the attitude of the ship during the free descent of the helicopter, permitting him to guide it into a safe landing place within an area beneath him, the size of the area being dependent upon his altitude and rate of forward speed at the time of the power failure.

Control system

The control vanes which have been designated generally by the numeral 17 are three in number and they are adapted to be angulated with respect to the vertical column of air driven by the propeller simultaneously and independently. One of the vanes indicated at 140 extends from a common central journal 141 for all three vanes toward the front of the helicopter. The other two vanes extend toward the rear and the respective opposite sides of the helicopter, the left vane being designated 142 and the right vane being designated 143. The vanes are arranged symmetrically around the vertical central axis of the aircraft, being spaced from one another by 120 degrees. The three vanes are of identical construction and each is mounted upon a control shaft 144, the three shafts meeting at the central journal 141. Each vane comprises a symmetrical airfoil section and the control rod extends through it longitudinally adjacent to the upper edge so that the vane is stable in the vertical position paraleling the flow of air driven down upon it by the propeller. As may be seen in FIGURES 2 and 4, the outer ends of the respective control shafts 144 may be journalled in appropriate bearings mounted within the brackets 26 for the landing gear. Journals for the inner ends of the three control shafts may be enclosed within a streamlined housing or hub 145. In addition, each one of the three control shafts has a sprocket wheel 146 keyed to it just to the outside of the control vane.

Going now to the diagrammatic views FIGURES 11 through 15, it will be seen that the three vanes may be selectively angulated by means of a control wheel designated generally 147 which is in the cockpit of the aircraft. Wheel 147 is mounted, by means of ball socket joints 148, upon top of three control levers, one of these control levers indicated at 149, is linked to control vane 140. A second of these control levers indicated at 150 is connected to the control vane 143, and the third control lever indicated at 151 is connected to the control vane 142. In other words, the fore and aft, left-right relationships of the levers 149, 150 and 151 are diametrically opposed to these relationships in the three control vanes 140, 142 and 143, which they operate. The three control levers are angulated inwardly as shown in the diagrammatic views simply to provide knee room for the pilot since he sits directly behind the control wheel. When the helicopter is at rest on the ground, or when it is ascending or descending vertically, the control wheel is horizontal. The wheel and a throttle (not shown) for the engines are the only primary controls required.

The lower end of the control lever 149 is forked and it is connected to the inner end of a shaft 152 which is mounted in a pair of journal blocks 153—153 for rotation about an axis extending fore and aft of the helicopter. A clevis pin 154 which connects the lower end of the lever 149 to the shaft 152 extends transversely of the axis of shaft 152. The slot in the forked end of lever 149 permits it to pivot on the center of the clevis pin 154 without having any effect upon the shaft. It is only when the control lever 149 is swung from one side to the other that the shaft 152 is moved, the shaft turning in the two journal blocks 153—153. The rear end of shaft 152 has a sprocket 155 affixed to it, and this sprocket is connected by means of a continuous pitch chain 156 to the sprocket 146 which is at the forward end of the fore and aft vane 140. As may be seen in FIGURE 11, a pair of idler sprockets 157 and 158 are employed to guide the pitch chain 156, the upper run of the pitch chain leaving the sprocket 155 on shaft 152 passes over the top of idler sprocket 157 and then down and around the underside of sprocket 146, then up and over the top of the second idler sprocket 158 where it becomes the lower run toward and around sprocket 155. Thus, if wheel 147 is pushed to the left this causes sprocket 155 to rotate in a counterclockwise direction, as viewed from the rear, which swings the bottom of the control vane 140 toward the left. The reaction of the column of air driven downwardly by the propeller on the angulated vane tends to tip the helicopter toward the left. Swinging the control lever 149 toward the right reverses this relationship, swinging the bottom of the control vane toward the right which causes the helicopter to tip toward the right. It is pointed out that movement of the wheel 139 fore and aft in alignment with the control vane 140 has no effect upon this vane since the slot at the lower end of lever 149 also is aligned fore and aft.

The lower end of the control lever 150 is also connected to a shaft which in this instance is indicated at 160. The latter shaft is aligned with the control vane 143 to which it is connected, and it is also connected to its actuator lever by means of a clevis pin similar to pin 154. In addition, journal blocks 161—161 are employed to mount the shaft so that it can only rotate about its longitudinal axis. Considering the wheel as a compass with the zero point being straight ahead and away from the pilot, the control shaft 160 extends from a point directly under the wheel toward the 300 degree mark on this imaginary compass which corresponds to the alignment of control vane 143 with respect to its journal, wherein it extends at 120 degrees toward the right rear of the aircraft. The outer end of the shaft 160 has a sprocket 162 affixed to it which is connected to sprocket 146 on vane 143 by means of a pitch chain 163. The pitch chain extends toward the front of the cockpit and around an idler 164 and then toward the right of the fuselage and around an idler 165. From here the pitch chain extends toward the rear and its upper run is engaged around an idler 166. From here it extends down and around the underside of the sprocket 146 which is on vane 143. The pitch chain returns by passing up and over an idler 167, thence forwardly and around an idler 168 which is on an axis common to the idler 165. From this point, the pitch chain extends toward the front of the cockpit and around an idler 169 and thence around the underside of the sprocket 162. As the wheel is pulled toward the pilot, the aircraft is tipped toward the rear. This is a result of the sprocket 162 being rotated counter-clockwise as viewed from the inner end of the shaft 160. This tightens the upper run of the pitch chain 164 which causes the bottom of the control vane 143 to swing toward the rear. The reaction to this angulated position causes the helicopter to tip toward the rear and toward the left. However, the control vane 143 operates simultaneously with control vane 142 so that the tendency to tip toward the left is cancelled out by the simultaneous angulation of the latter vane as will be presently pointed out.

The pin connection at the lower end of the control lever 152 to a shaft 170 is identical to the connections of the other control levers previously described. In this case, the axis of shaft 170 is at 60 degrees from a point immediately below the control wheel 147, which corresponds to the 240 degree angular relationship of the longitudinal axis of the control shaft 144, upon which vane 142 is mounted. The outer end of shaft 170 has sprocket 171 affixed to it which is connected by means of a pitch chain 172 to sprocket 146 which is affixed to the outer end of the control shaft 144 upon which control vane 142 is mounted. The upper run of the pitch chain extends from the sprocket 171 around an idler 173 which is on the same vertical axis with the two idlers 164 and 169. From this point, the upper run of the pitch chain extends toward the left within the fuselage, around an idler 174 and an idler 175, and thence down and around the underside of sprocket 146. The return of the chain is around an idler 176 and an idler 177, the latter idler being on the same vertical axis with the idler 174. The lower run of the chain then extends toward the front of the cockpit, and then around an idler 178 which is directly beneath the idler 173 and on the same axis with the other two idlers previously described. From here the lower run of the pitch chain 172 extends around the sprocket 171.

Considering again that the pilot pulls the wheel straight back toward himself, sprocket 171 is rotated in the counter-clockwise direction as viewed from the inner end of shaft 170. This tightens the lower run of the pitch chain 172 and causes the lower end of control vane 142 to swing toward the rear and toward the right of the helicopter. In pulling the wheel straight back toward himself, the pilot is at the same time rotating the shaft 160 an equal amount with shaft 170 to swing the control vane 143 toward the rear and to the left as previously described. The angulation of the two vanes 142 and 143 with respect to one another cancels out the angular components except for those which tend to raise the nose of the helicopter.

Suppose now the pilot turns the wheel about its vertical axis without moving it in any direction from this axis. All three of the shafts 152, 160 and 170 would be rotated in equal amounts, and the lower edges of all three control vanes would be swung to present surfaces to a vertical column of air from the propeller which would cause the helicopter to rotate about its vertical axis toward the left, or counter-clockwise as viewed from above. The same thing would happen, but in the opposite direction, if the pilot were to rotate the control wheel to the right. It is believed to be clear from this that the pilot may tip, turn and bank the aircraft in any direction he pleases by a combination of turning and swinging movements of the wheel. Furthermore, it will be noted that the movement which the pilot makes on the wheel is related directly to the attitude which the aircraft assumes. The movement of the wheel, therefore, is a natural one to the pilot and one that is easily mastered by a novice.

The attitude which the aircraft assumes in flight is also a function of the amount of lift developed by the rotor and by the propeller; and, since it is the reaction against the column of air which is driven down over the vanes by the propeller which is used to tip and turn the whole helicopter, the speed of this column of air is directly related to the changes which are made in the attitude of the aircraft by selectively angulating the vanes. Throttling devices for the engines are not shown here because these may be types which are generally known. It is recommended however that the throttles be located at the left side of the pilot and that they open or increase the speed of the engines upon being raised or swung upwardly, this movement being a natural one inasmuch as the speeding up of engine causes the aircraft to ascend.

Preferably, the engines are started with the rotor vanes feathered. This is accomplished from the cockpit by the pilot operating the threaded sleeve 68 through the cable 74 in order to lower the two slide blocks 61 and 62. This has the effect of tightening the lower runs of the pitch chains 56 to cause the inner ends of both of the rotor arms to rotate opposite to the direction shown by the arrows in FIGURE 9. If a variable pitch propeller is employed, it too may be feathered. If desired, a slight negative angle of attack may be set into the two rotor vanes during starting so as to insure the helicopter remaining in place on the ground. With the engine brought up to speed and with both the rotor and propeller rotating, the pilot then may increase the angle of attack of the two vanes simultaneously to develop upward lift so that the helicopter rises off of the ground. By adjusting either the degree of pitch or the throttle settings or both, the pilot can, of course, level off at a selected altitude. As explained previously, turning the wheel 147 either to the left or right causes the helicopter to turn without tilting around its vertical axis so that the pilot can if he wishes turn the aircraft in the direction in which he wishes to fly without banking. At this time the pilot may move the wheel 147 forward which tips the helicopter in that direction. This has the effect of angulating the rotor with respect to the horizontal and of angulating the high speed column of air which is exhausted from the bottom of the throat. Components of the thrust developed by the rotor and the propeller are resolved in the forward direction so that the helicopter starts ahead in the direction of tilt. By adjusting the throttle setting lift is retained while flying in the forward direction in order to maintain a fixed altitude. As explained previously, the aircraft may be controlled in flight by manipulation of the control vanes by wheel 147. The helicopter may be brought to a landing where desired by hovering the aircraft over a selected spot and then slowly throttling back the engines or by making a slight change in the pitch of the rotor to decrease the lift developed.

The interconnection by pitch chain 56 from one rotor arm to the other becomes effective to automatically adjust the rotor vanes for the differences in relative air speeds which they encounter in forward flight as soon as forward flight begins. This pitch change is a relative thing, however, and it is dependent only upon relative air speeds. Hence, it automatically adjusts for cross winds and turbulent air during the flight of the helicopter so that the tip path of the rotor vanes remains in a plane, i.e., the arms do not have to "flap" in order to compensate for turbulence.

It is anticipated that the automatic compensation of the two vanes with respect to one another which is provided may be employed in helicopters other than the specific type disclosed here, and in addition, that it may be employed in autogyro types of aircraft. The lift created by the rotor is independent of the propeller and thus the rotor may be used in helicopters or other types of aircraft wherein some means other than a propeller is used for overcoming the torque generated by the drive to the rotor.

Having described my invention, I claim:

1. A helicopter comprising a fuselage configured to define a substantially large circular throat which extends vertically through the center thereof, a rotor which is mounted for rotation about the vertical central axis of the fuselage and which is disposed above the fuselage, a propeller mounted within said throat for rotation about the vertical central axis thereof, means interconnecting the rotor and the propeller, whereby the propeller rotates at a substantially higher rate of speed than the rotor and in a direction counter to the direction of rotation of said rotor, means to simultaneously drive said rotor and said propeller, a plurality of vanes mounted adjacent to the lower end of the throat opening and means for selectively adjusting the angulation of said vanes with respect to the vertical central axis of the fuselage to react with the air driven downwardly by the propeller.

2. A helicopter comprising a fuselage configured to define a circular throat which extends vertically therethrough, a rotor mounted for rotation about the vertical central axis of said throat above said fuselage, a propeller mounted within said throat for rotation about the vertical central axis thereof, drive means interconnecting the rotor and the propeller to rotate the propeller at a substantially higher rate of speed than the rotor and in a direction counter to the direction of rotation of said rotor to propel a high speed column of air downwardly through said throat, means to selectively direct the column of air upon its issuing from the throat, the reaction caused thereby resulting in a change in the attitude of the helicopter in flight.

3. A helicopter comprising a doughnut-shaped fuselage having a substantially large, circular throat extending vertically through the center thereof, a propeller mounted within said throat and arranged to propel a column of air downwardly therethrough, a lift rotor disposed above said fuselage, torque equalizing means interconnecting the rotor and the propeller for rotation in opposite directions about the vertical central axis of the fuselage with the propeller rotating at a substantially higher rate of speed than the rotor, means to simultaneously drive said rotor and propeller, and a plurality of selectively adjustable vanes mounted beneath the fuselage at the exit to the throat to change the direction of the stream of air driven downwardly through the throat by the propeller, the reaction caused by such change altering the attitude of the helicopter in flight.

4. A helicopter comprising in combination a fuselage having a large circular throat extending downwardly therethrough, a propeller disposed in said throat for rotation about the central axis thereof, a rotor disposed above the fuselage and having lift vanes thereon which extend beyond the sides of the fuselage, said rotor mounted for rotation about an axis common to the axis of rotation of the propeller, means including a planetary gear transmission interconnected with the rotor and with the propeller to cause them to rotate in opposite directions, an engine having a drive shaft which is connected to said planetary gear transmission for driving the rotor and propeller, and a plurality of adjustable vanes mounted beneath said throat for reaction with air driven downwardly through said throat by said propeller for changing the attitude of the helicopter in flight.

5. In a helicopter the combination of a fuselage having a substantially large, circular throat extending vertically through the center thereof, a propeller mounted within said throat and arranged to drive a column of air downwardly therethrough, a vaned lift rotor disposed above the fuselage, drive means interconnected with the rotor and with the propeller to drive the rotor and propeller in opposite directions, and the latter named means including a double planetary gear transmission adapted to equalize the torque developed at the rotor and at the propeller.

6. In a helicopter the combination of a fuselage having a substantially large, circular throat extending vertically through the center thereof, a propeller mounted within said throat and arranged to drive a column of air downwardly therethrough, a rotor which is disposed above the fuselage, and drive means interconnecting the rotor and the propeller for rotation in opposite directions about the vertical central axis of the fuselage with the propeller rotating at a substantially higher rate of speed than the rotor.

7. A helicopter comprising a fuselage having a substantially large circular throat extending vertically through it, a planetary gear transmission, means mounting said planetary gear transmission in the center of said throat, at least one engine mounted in said fuselage and having a drive shaft connected to said planetary gear transmission, a drive shaft extending downwardly from said gear transmission and having a propeller mounted thereon arranged to drive a column of air downwardly through said throat, a second drive shaft extending upwardly from said transmission, a rotor upon the latter named shaft which is located above the fuselage, said rotor having lift vanes at the opposite ends thereof which extend outwardly beyond the sides of the fuselage, and said gear transmission being arranged to cause the propeller to rotate at a speed which equalizes the torque generated at the rotor.

8. In a helicopter the combination of a fuselage having a substantially large circular throat extending vertically through it, a planetary gear transmission, means mounting said planetary gear transmission at the center of said throat, at least one engine mounted in said fuselage and having a drive shaft connected to said planetary gear transmission, a drive shaft extending downwardly from said gear transmission and having a propeller mounted thereon for rotation to drive a column of air downwardly through said throat, a second drive shaft extending upwardly from said transmission, and a lift rotor upon the latter named shaft which is located above the fuselage.

9. A helicopter comprising a fuselage having a large central, circular throat extending vertically through it, a transmission located at the center of said throat, an engine powering said transmission, a propeller in driving connection with said transmission which is arranged for propelling a column of air down through said throat, a substantially large rotor which is in driving connection with said transmission and which is located above the fuselage, said transmission arranged to drive the propeller at a substantially higher rate of speed than the rotor and in the opposite direction to equalize the torque developed upon the rotation thereof, and a plurality of selectively operable vanes disposed at the lower end of said throat in positions to react against the column of air driven downwardly by said propeller.

10. In a helicopter having a large central throat extending vertically through it, a double planetary gear transmission located at the center of said throat, an engine in driving connection with said transmission, a propeller in driving connection with said transmission and arranged to propel a column of air down through said throat, a large, vaned, lift rotor which is in driving connection with said transmission and which is located above the fuselage, and said double planetary gear transmission arranged to drive the propeller at a substantially higher rate of speed than the rotor and in the opposite direction.

11. In a helicopter having a large circular throat extending vertically through the fuselage thereof, a lift rotor above the fuselage disposed for rotation in a substantially horizontal plane, a propeller disposed within the throat for rotation in a substantially horizontal plane to drive a column of air downwardly through said throat, a first shaft extending downwardly from said rotor, a second shaft extending upwardly from said propeller, a transmission connected to and arranged to drive simultaneously the rotor and the propeller through the respective shafts, said transmission including an upper planetary gear unit in driving connection with the first shaft and a lower planetary gear unit in driving connection with the second shaft, means interconnected respectively with the upper planetary gear unit and with the lower planetary gear unit for driving said gear units in opposite directions, and a connecting shaft having a gear at its upper end which is meshed with the upper planetary gear unit and a gear which is at its lower end which is meshed with the lower planetary gear unit, said connecting shaft equalizing the torque which is exerted by the respective planetary gear units in driving the rotor and propeller in opposite directions.

12. In a helicopter having a large circular throat extending vertically through the fuselage thereof, a large rotor disposed above the fuselage to create lift upon the rotation thereof, a propeller disposed within the throat to create lift upon the rotation thereof to drive a column of air downwardly through said throat, a transmission connected to and arranged to drive simultaneously the rotor and the propeller in opposite directions, including an upper planetary gear unit in driving connection with said rotor and a lower planetary gear unit in driving connection with said propeller, means inter-connected respectively with the upper planetary gear unit and with the lower planetary gear unit for driving said gear units in opposite directions, and means interconnecting the upper planetary gear unit with the lower planetary gear unit to equalize the torque which is developed by the respective planetary gear units in driving the rotor and propeller in opposite directions.

13. A helicopter having a circular throat extending vertically through it, a lift rotor mounted above the helicopter for rotation about the vertical central axis of said throat, a propeller mounted within said throat for rotation about said axis, means to drive said rotor and propeller in opposite directions, the last named means including means to equalize the torque developed upon the rotation of the rotor and propeller, said propeller adapted to operate at a substantially high rate of speed to drive a column of air vertically downwardly through the throat, a plurality of directing vanes mounted within said throat, said directing vanes normally being streamlined with respect to the column of air issuing from said throat, and means for selectively angulating said vanes with respect to the direction of flow of the column of air, whereby the attitude of the aircraft may be altered.

14. A helicopter having a fuslage with a circular throat extending vertically through it, a substantially large lift rotor mounted above the helicopter for rotation about the vertical central axis of said throat, said rotor having lift vanes thereon which extend radially outwardly beyond the sides of said circular fuselage, a propeller mounted within said throat for rotation about the central axis thereof, means to drive said rotor and propeller in opposite directions, said propeller adapted to operate at a substantially higher rate of speed than the rotor to drive a column of air vertically downwardly through the throat, a plurality of directing vanes mounted within said throat, said vanes extending radially outwardly from the central axis of the throat and being streamlined with respect to the column of air issuing from said throat, and means for selectively angulating said vanes with respect to the vertical direction of flow of the column of air, whereby the attitude of the aircraft may be altered.

15. A helicopter having a substantially circular fuselarge with a large circular throat extending vertically through the center thereof, a rotor mounted for rotation about the vertical central axis of the throat which is disposed above the fuselage, a propeller mounted for rotation about the vertical central axis of the throat which is disposed in said throat, means to rotate the rotor and propeller in opposite directions with the propeller driving a column of air downwardly through said throat, a plurality of directing vanes mounted below said throat for turning movement about axes which extend radially outwardly from the vertical central axis of the throat, means at the outer end of each one of the vanes for turning the vane to angulate it with respect to the direction of flow of the air issuing from the throat, a control wheel within the cockpit of the helicopter and means interconnecting the outer ends of the vanes to the control wheel for selectively angulating the control vanes to alter the attitude of the aircraft in flight.

References Cited in the file of this patent
UNITED STATES PATENTS

| | | |
|---|---|---|
| 1,326,701 | Weddell | Dec. 30, 1919 |
| 1,401,992 | Leinweber | Jan. 3, 1922 |
| 1,406,277 | Persson | Feb. 14, 1922 |
| 1,723,479 | Goodrich | Aug. 6, 1929 |
| 2,377,835 | Weygers | June 5, 1945 |
| 2,395,809 | Goddard | Mar. 5, 1946 |
| 2,415,148 | Sikorsky | Feb. 4, 1947 |
| 2,461,435 | Newmann | Feb. 8, 1949 |
| 2,500,860 | Penn | Mar. 14, 1950 |

FOREIGN PATENTS

| | | |
|---|---|---|
| 449,741 | Canada | July 13, 1948 |